UNITED STATES PATENT OFFICE.

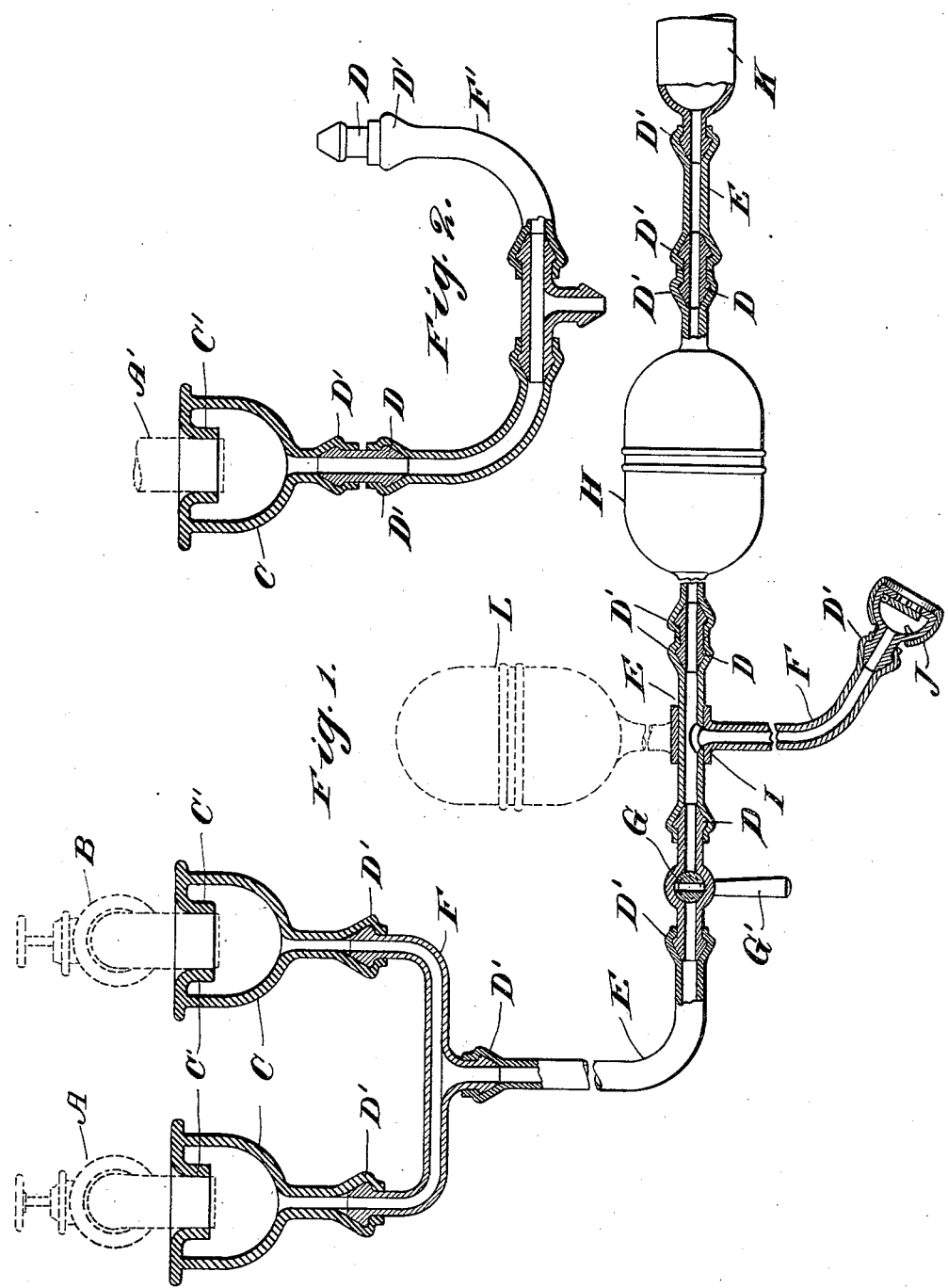

JUDSON R. SWIFT, OF NEW YORK, N. Y.

SYRINGE.

1,005,356.  Specification of Letters Patent.  Patented Oct. 10, 1911.

Application filed March 15, 1911. Serial No. 614,570.

*To all whom it may concern:*

Be it known that I, JUDSON R. SWIFT, a citizen of the United States, and a resident of New York city, borough of Brooklyn, in the county of Kings and State of New York, have invented certain new and useful Improvements in Syringes, of which the following is a specification.

My invention relates to syringes and the object of my invention is to provide a syringe which may be directly connected to a water faucet, or to two of them, in such manner as to provide for the regulation of the temperature of the flowing water through the syringe.

A further object is to provide means whereby water may also be drawn from an open vessel which may contain a healing or antiseptic solution and force it through the syringe.

Further objects and advantages of my invention will be hereinafter described and referred to in the claims forming part of this specification.

Referring to the drawings: Figure 1 is a sectional view through the main portions of my device, showing it attached to two faucets of the usual kind employed in the toilet closet of most houses. Fig. 2 is a sectional view of the means used when the device is attached to but one faucet.

A, A′ and B indicate respectively two hot water faucets and a cold water faucet.

C indicates a flexible rubber portion which is provided with an opening C′ of smaller diameter than that of the end of the faucet, the rubber being forced to stretch over the end of the faucet and held thereto by friction, as will be readily understood. Hard rubber couplings D are used to couple together the ends of the hose sections, and the other parts which are provided with flexible rubber ends, said flexible ends being indicated by D′.

The sections of rubber tubing are indicated by E, and may be of any desired length.

A T coupling portion indicated by F, in Fig. 1, is shown as made in one piece, and is made of hard rubber, or if flexibility is required in order to be adjustable to faucets spaced at different distances apart, I may use the construction indicated by F′, partly shown in dotted lines, consisting of soft rubber tubing coupled together as indicated.

A cock G, is provided with coupling ends and located between the faucets and the pump H as shown. A branch tubular section I is located between the cock G and pump H, and the lower extreme end is provided with a check valve, the upper end of the casing of which is provided with a coupling end as shown, by means of which it is attached to the tube E.

K indicates the nozzle portion of the device.

The dotted lines L indicate a pump bulb, and illustrates that this portion may be connected as indicated in dotted lines, to the branch portion I, instead of directly in line with the nozzle as shown by H. In using the syringe, the cock G is first opened by turning the handle G′ in line with the passage through body, and the faucets A and B are adjusted to permit the proper quantity of water to flow per minute and at the right temperature. The nozzle may then be used. After sufficient warm water has been used, the cock G may be closed, thus shutting off the water from the faucets, and by alternately compressing and expanding the bulb-pump H, or L, the water or fluid in the vessel in which the check valve portion has been previously placed, may be drawn and forced through the nozzle. Where it is not desired to use the section I, this section may be disconnected and the cock G and nozzle K may be connected directly by means of a tube section E, as will be readily understood.

By this construction I dispense with the usual rubber bag or can for holding water, thus providing a cheaper construction and also am enabled to draw from an unlimited supply of water under any desired pressure. Further, I am enabled to economize in the use of the antiseptic fluid, since a much smaller quantity will suffice if used at the end of the flushing period.

Having thus described my invention, I claim as new:

1. A syringe having a portion adapted to be connected to a house faucet, a flexible tubular portion, a branch portion having a check valve at one end, and a nozzle, and a pump arranged to draw fluid through said check valve and force same through said nozzle.

2. A syringe having a portion adapted to be connected to a house faucet, a flexible tubular portion, a branch portion having a check valve at one end, a nozzle, a pump arranged to draw fluid through said check valve and force same through said nozzle, and a cock located adjacent to said pump.

3. A syringe having two end portions each adapted to be connected to a house faucet, a T portion connecting said first named portions, a tubular flexible portion connected to said T portion, a nozzle connected to said tubular portion, a cock controlling the passage through said tube portion located between said first named end portions and said nozzle, and a branch portion connected to said tubular portion and provided with a check valve at one end thereof, and a pump arranged to draw fluid through said check valve and force same through said nozzle.

4. A syringe having a portion adapted to be connected to a house faucet, a nozzle, a flexible tubular portion leading to said nozzle, a branch portion connected to said flexible tubular portion in communication with a separate source of fluid supply, and a pump arranged to draw fluid through said branch portion and force same through said nozzle.

Signed at New York city, in the county of New York and State of New York this 1st day of March A. D. 1911.

JUDSON R. SWIFT.

Witnesses:
FRANK M. ASHLEY,
GEORGE LEE KEENEY.

---

Copies of this patent may be obtained for five cents each, by addressing the "Commissioner of Patents, Washington, D. C."